United States Patent
Gimby et al.

(10) Patent No.: US 7,400,325 B1
(45) Date of Patent: Jul. 15, 2008

(54) CULLING BEFORE SETUP IN VIEWPORT AND CULLING UNIT

(75) Inventors: Robert W. Gimby, West Bloomfield, MI (US); Henry Packard Moreton, Woodside, CA (US); Thomas M. Ogletree, Lakeway, TX (US); David C. Tannenbaum, Austin, TX (US); Andrew D. Bowen, Austin, TX (US); Christopher J. Goodman, Round Rock, TX (US); Vimal Parikh, Fremont, CA (US); Craig M. Wittenbrink, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 726 days.

(21) Appl. No.: 10/913,667

(22) Filed: Aug. 6, 2004

(51) Int. Cl.
*G06T 15/40* (2006.01)

(52) U.S. Cl. .................. 345/421; 345/418; 345/419; 345/422; 345/423; 345/620; 345/622

(58) Field of Classification Search ................ 345/421, 345/422, 423, 418, 419, 428, 620, 622
See application file for complete search history.

(56) References Cited

U.S. PATENT DOCUMENTS

| | | | |
|---|---|---|---|
| 5,535,374 A | 7/1996 | Olive | |
| 6,184,908 B1 | 2/2001 | Chan et al. | |
| 6,417,858 B1 | 7/2002 | Bosch et al. | |
| 6,457,036 B1 | 9/2002 | Sloan | |
| 6,504,538 B1 | 1/2003 | Freund et al. | |
| 6,552,733 B1 | 4/2003 | Taylor et al. | |
| 6,593,923 B1 | 7/2003 | Donovan et al. | |
| 6,597,363 B1 * | 7/2003 | Duluk et al. ................ 345/506 |
| 6,611,265 B1 | 8/2003 | Hong et al. | |
| 6,900,818 B1 * | 5/2005 | Moffitt et al. ............... 345/622 |
| 6,901,389 B1 | 5/2005 | Madison et al. | |
| 7,034,828 B1 | 4/2006 | Drebin et al. | |
| 7,148,888 B2 | 12/2006 | Huang | |
| 7,158,132 B1 * | 1/2007 | Moffitt et al. ............... 345/421 |
| 2002/0126127 A1 | 9/2002 | Fox | |
| 2004/0130552 A1 | 7/2004 | Duluk et al. | |
| 2005/0195210 A1 | 9/2005 | Demers et al. | |

* cited by examiner

*Primary Examiner*—Kimbinh T Nguyen
(74) *Attorney, Agent, or Firm*—Townsend and Townsend and Crew, LLP

(57) ABSTRACT

The VPC unit and setup unit of a graphics processing subsystem perform culling operations. The VPC unit performs culling operations on geometric primitives falling within a specific criteria, such as having a property within of a numerical range limit. This limit reduces the complexity of the VPC unit. As increasing rendering complexity typically produces a large number of small primitives, the VPC unit culls many primitives despite its limitations. The VPC unit also includes a cache for storing previously processed vertices in their transformed form, along with previously computed culling information. This increases the VPC unit throughput by reducing the number of memory accesses and culling operations to be performed. The setup unit performs culling operations on any general primitive that cannot be culled by the VPC unit. By performing a first series of culling operations in the VPC unit, the processing burden on the setup unit is decreased.

19 Claims, 7 Drawing Sheets

CULLING BEFORE SETUP IN VIEWPORT AND CULLING UNIT

CROSS-REFERENCES TO RELATED APPLICATIONS

This application is related to U.S. patent applications "Culling Before Attribute Read," Ser. No. 10/912,930, filed Aug. 6, 2004, now U.S. Pat. No. 7,292,239, and to "Diamond Culling," Ser. No. 10/913,637, filed Aug. 6, 2004, now U.S. Pat. No. 7,307,628, which are incorporated by reference herein for all purposes.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Graphics processing subsystems typically use a stream-processing model, in which input elements are read and operated on by successively by a chain of stream processing units. The output of one stream processing unit is the input to the next stream processing unit in the chain. Typically, data flows only one way, "downstream," through the chain of stream processing units. Examples of stream processing units include vertex processors, which process two- or three-dimensional vertices, rasterizer processors, which process geometric primitives defined by sets of two- or three-dimensional vertices into sets of pixels or sub-pixels, referred to as fragments, and fragment processors, which process fragments to determine their color and other attributes.

Typically, the rendering commands and data sent to the graphics processing subsystem define a set of geometric primitives that are potentially visible in the final rendered image. The set of potentially visible geometric primitives is typically much larger than the set of geometric primitives actually visible in the final rendered image. To improve performance, the graphics processing subsystem can perform one or more visibility tests to determine the potential visibility of geometric primitives. Using the results of these tests, the graphics processing subsystem can remove, or cull, geometric primitives that are not visible from the set of potentially visible geometric primitives, thereby reducing the number of geometric primitives to be rendered.

Previously, visibility testing and culling of geometric primitives, referred to as culling operations, were performed in the setup and rasterization units of the graphics processing subsystem. As rendered scenes become more complex, they typically include a large number of small geometric primitives. The increasing number of geometric primitives tends to create processing bottlenecks in the setup unit. Additionally, the vertices associated with each geometric primitive can include a set of attributes used for rendering. The bandwidth required to communicate vertices and their associated attributes to the setup unit creates further processing bottlenecks. This problem is exacerbated by the increasing number of attributes associated with vertices to perform complex rendering operations.

It is therefore desirable to perform culling operations as soon as possible in the graphics processing subsystem to decrease wasteful rendering operations, to reduce the bandwidth requirements for communicating vertices and associated attributes, and to improve rendering performance. It is further desirable to reduce processing bottlenecks in the setup unit without substantially increasing the complexity of other portions of the graphics processing subsystem.

BRIEF SUMMARY OF THE INVENTION

In an embodiment of the invention, both the VPC unit and setup unit perform culling operations. The VPC unit performs culling operations on geometric primitives falling within a specific criteria, such as having a property within of a numerical range limit of the VPC unit. This limitation reduces the complexity of the VPC unit. As increasing rendering complexity typically produces a large number of small primitives, the VPC unit can cull many primitives despite its culling limitations. The VPC unit also includes a cache for storing previously processed vertices in their transformed form, along with culling information previously computed for the vertices. This increases the VPC unit throughput by reducing the number of memory accesses and culling operations to be performed. The setup unit performs culling operations on any general primitive that cannot be culled by the VPC unit. By performing a first series of culling operations in the VPC unit, the processing burden on the setup unit is decreased. Furthermore, culling primitives in the VPC reduces the number of vertices and associated attributes communicated with the setup unit, and hence reduces the bandwidth requirements.

In an embodiment, a graphics processing subsystem adapted to render a stream of primitives includes a first cache memory adapted to store a set of vertices associated with at least a portion of a first stream of primitives and a viewport and culling unit adapted to receive the first stream of primitives and to transform a subset of the set of vertices associated with each primitive to a screen-space coordinate system. The viewport and culling unit is adapted to determine the potential visibility of each one of the first stream of primitives and to output as the second stream of primitives a subset of the first stream of primitives that are potentially visible. A setup unit is adapted to receive a second stream of primitives from the viewport and culling unit and to prepare each primitive for rasterization.

In a further embodiment, the setup unit is further adapted to determine the potential visibility of each one of the second stream of primitives and to output a third stream of primitives that are potentially visible. In one embodiment, the viewport and culling unit is adapted to determine the potential visibility of primitives using at least a first culling operation, and the setup unit is adapted to determine the potential visibility of primitives using at least a second culling operation. In another embodiment, the viewport and culling unit is adapted to determine the potential visibility of primitives within a range limit using at least a first culling operation, and the setup unit is adapted to determine the potential visibility of primitives outside of the range limit using at least the first culling operation.

In another embodiment, the viewport and culling unit is adapted to determine the potential visibility of each one of the first stream of primitives using a frustum culling operation, a backface culling operation, a bounding box culling operation, a diamond culling operation, a scissor culling operation, and/or a coarse grid line snap culling operation. In yet a further embodiment, the stream of primitives can include a point, a line, and/or a triangle.

BRIEF DESCRIPTION OF THE DRAWINGS

The invention will be described with reference to the drawings, in which.

DETAILED DESCRIPTION OF THE INVENTION

Figure 1:
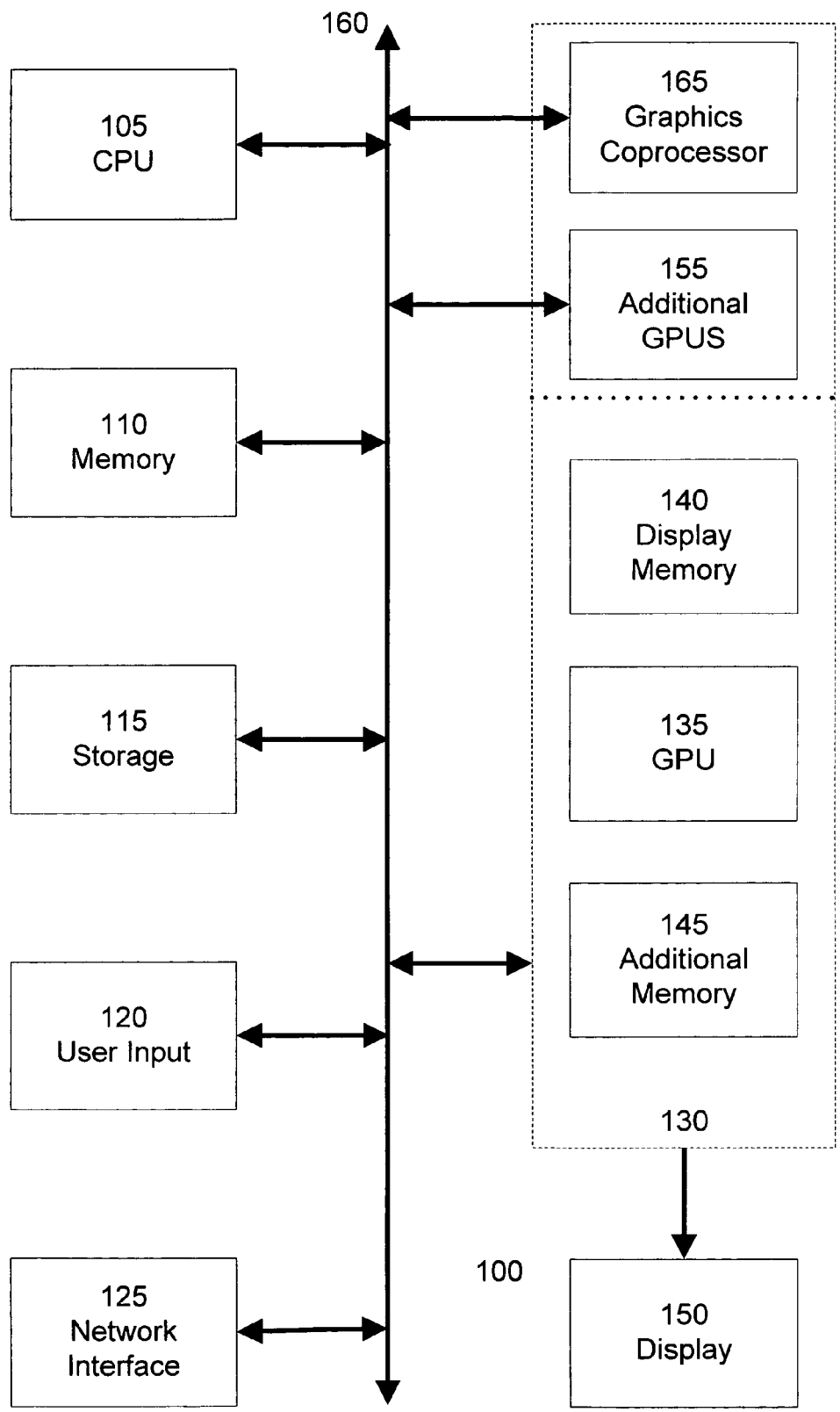
FIG. 1 is a block diagram of an example computer system suitable for implementing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-Express, and HyperTransport data buses.

A graphics subsystem 130 is further connected with data bus 160 and the components of the computer system 100. The graphics subsystem may be integrated with the computer system motherboard or on a separate circuit board fixedly or removably connected with the computer system. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 140 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135, or in place of GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same circuit board as GPU 135 and sharing a connection with GPU 135 to data bus 160, or can be located on additional circuit boards separately connected with data bus 160. Additional GPUs 155 can also be integrated into the same module or chip package as GPU 135. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip used to control the data bus 160.

Figure 2:
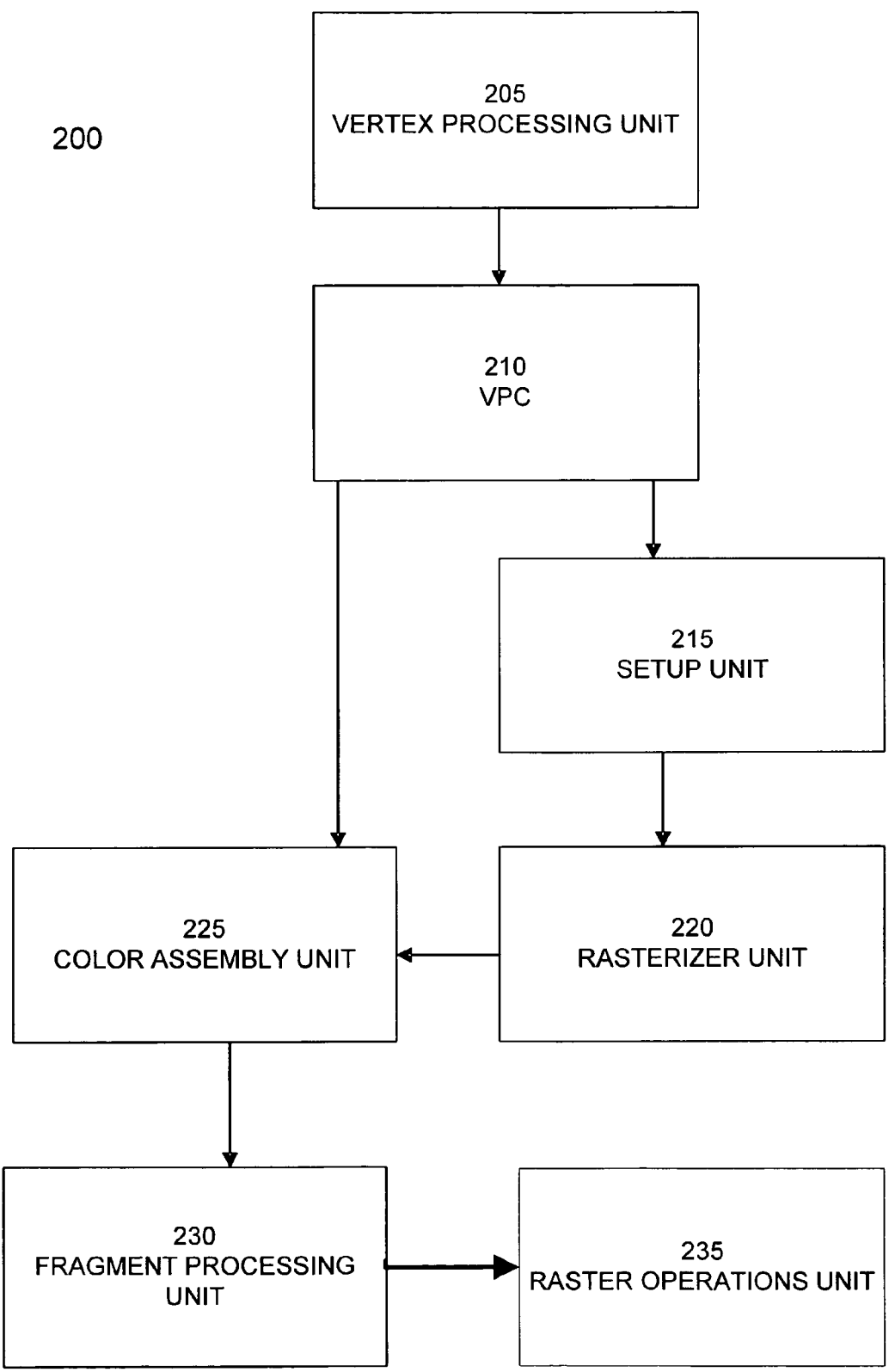
FIG. 2 illustrates a block diagram of a rendering pipeline of a graphics processing subsystem according to an embodiment of the invention.

FIG. 2 illustrates a block diagram of a rendering pipeline 200 of a graphics processing subsystem according to an embodiment of the invention. Pipeline 200 may be implemented in GPU 135 and/or described above. Pipeline 200 includes a vertex processing unit 205, a viewport and culling (VPC) unit 210, a setup unit 215, a rasterizer unit 220, a color assembly block 225, and a fragment processing unit 230.

Vertex processing unit 205 receives rendering commands and data used to define the desired rendered image or images, including geometry, lighting, shading, texturing, motion, and/or camera parameters for a scene. The rendering data may include one or more vertices defining geometric primitives. Examples of geometric primitives include points, lines, triangles, and other polygons. Each vertex has a position that is typically expressed in a two- or three-dimensional coordinate system. In addition to a position, each vertex also has various attributes associated with it. In general, attributes of a vertex may include any property that is specified on a per-vertex basis. In an embodiment, the vertex attributes include scalar or vector attributes used to determine qualities such as the color, transparency, lighting, shading, and animation of the vertex and its associated geometric primitives.

Vertex processing unit 205 executes one or more vertex programs, also referred to as a vertex shader, on each vertex to create a transformed vertex. The vertex processing unit 205 is programmable and rendering applications can specify the vertex program to be used for any given set of vertices. In a simple embodiment, the vertex program transforms a vertex from a three-dimensional world coordinate system to a two-dimensional screen coordinate system. More complicated vertex programs can be used to implement a variety of visual effects, including lighting and shading, procedural geometry, and animation operations. Numerous examples of such "per-vertex" operations are known in the art and a detailed description is omitted as not being critical to understanding the present invention. Vertex shader programs can implement algorithms using a wide range of mathematical and logical operations on vertices and data, and can include conditional or branching execution paths and direct and indirect memory accesses.

The viewport and culling unit 210 culls or discards geometric primitives and/or portions thereof that are outside the field of view or otherwise unseen in the rendered image. By discarding geometric primitives that are not seen in the rendered image, culling decreases the number of geometric primitives to be processed by downstream processing stages of the rendering pipeline 200 and thus increases rendering speed.

Setup unit 215 assembles one or more vertices into a geometric primitive, such as a triangle or quadrilateral. The rasterization stage 220 then converts each geometric primitive into one or more pixel fragments. A pixel fragment defines a set of one or more pixels to be potentially displayed in the rendered image. Each pixel fragment includes information defining the appearance of its pixels, for example screen position, texture coordinates, color values, and normal vectors.

Color assembly block 225 associates the pixel fragments received from rasterizer 220 with the per-vertex attributes, such as vertex colors, depth values, vertex normal vectors, and texture coordinates, received from vertex processing unit 205 and generates additional attributes for interpolating per-vertex attribute values at any point within the pixel fragments. The pixel fragments and associated attributes are provided to fragment processor 230.

Fragment processor 230 uses the information associated with each pixel fragment to determine the output color value of each pixel to be potentially displayed. Like the vertex processor 205, the fragment processing unit is programmable. A pixel fragment program, also referred to as a pixel or fragment shader, is executed on each pixel fragment to determine an output color value for a pixel. Although the pixel fragment program operates independently of the vertex shader program, the pixel fragment program may be dependent upon information created by or passed through previous stream processing units, including information created by a vertex program.

Rendering applications can specify the pixel fragment program to be used for any given set of pixel fragments. Pixel fragment programs can be used to implement a variety of visual effects, including lighting and shading effects, reflections, texture mapping and procedural texture generation. Numerous examples of such "per-pixel" operations are known in the art and a detailed description is omitted as not being critical to understanding the present invention. Pixel fragment shader programs can implement algorithms using a wide range of mathematical and logical operations on fragments and data, and can include conditional or branching execution paths and direct and indirect memory accesses.

The colored fragments are then output to the raster operations and storage unit 235. The raster operations unit 235 integrates the fragments output from the fragment processing unit 230 with the rendered image. Fragments can be blended or masked with pixels previously written to the rendered image. Depth buffers, alpha buffers, and stencil buffers can also be used to determine the contribution of each incoming fragment, if any, to the rendered image. The combination of each incoming fragment and any previously stored pixel values is then output to a frame buffer, stored for example in display memory 140, as part of the rendered image.

An embodiment of the invention, both the VPC unit 210 and setup unit 215 perform culling operations. The VPC unit 210 performs culling operations on geometric primitives falling within a specific criteria, such as having an area less than a given size or a property outside of a numerical range limit of the VPC unit 210. This limitation reduces the complexity of the VPC unit 210. The setup unit 215 can perform culling operations on any general primitive that cannot be culled by the VPC unit 210. By performing a first series of culling operations in the VPC unit 215, the processing burden on the setup unit 215 is decreased. Furthermore, culling primitives in the VPC reduces the number of vertices and associated attributes communicated with the setup unit 215, and hence reduces the bandwidth requirements. Moreover, as increasing rendering complexity typically produces a large number of small primitives, the VPC unit 210 can cull many primitives despite its culling limitations. It should be noted that many culling operations determine the potential visibility of a primitive; thus, even if a primitive is not culled by the culling operations, it may nonetheless not be visible in the final rendered image, for example due to occlusion from other primitives.

Figure 3:
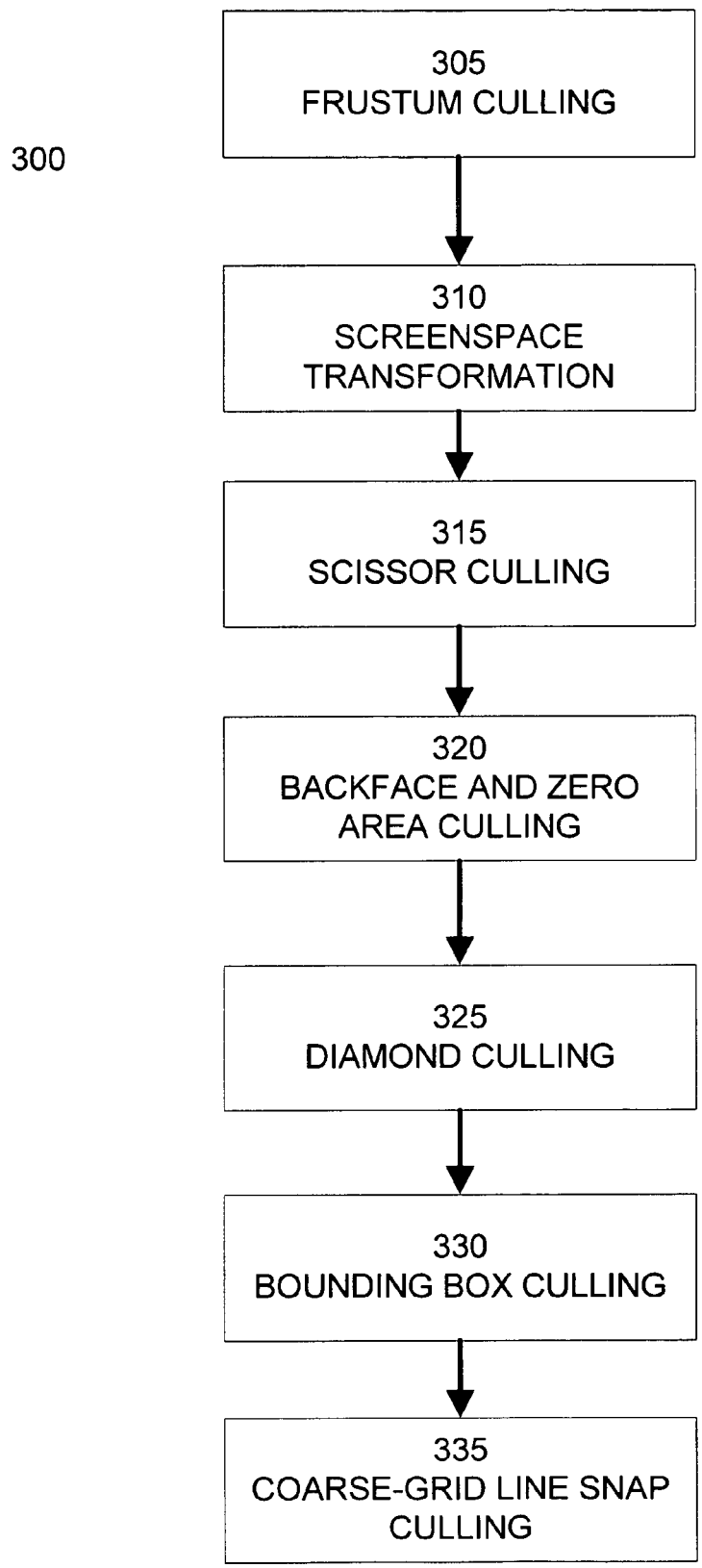
FIG. 3 illustrates an example series of culling operations to be performed in advance of the setup unit according to an embodiment of the invention.

FIG. 3 illustrates an example series 300 of culling operations to be performed in advance of the setup unit according to an embodiment of the invention. In an embodiment, the series 300 of culling operations is performed by a viewport and culling unit, such as VPC unit 210 discussed above. The sequence of culling operations in series 300 is intended for illustration, and alternate embodiments of the invention can perform these culling operations in a different order. Additionally, as discussed in more detail below, some or all of these culling operations can be performed in parallel, for example using a pipelined implementation. Further embodiments can include only a portion of the series 300 of culling operations, or include additional culling operations well known in the art. Regardless of the order of the series 300 of culling operations, if a primitive is discarded by any of the culling operations, then any subsequent culling operations can be bypassed.

In an embodiment, the series 300 of culling operations begins by receiving a set of vertices associated with a geometric primitive. In an embodiment, the vertices are represented in a homogeneous clip space coordinate system, expressed for example as (x,y,z,w). Frustum culling 305 discards geometric primitives located entirely outside of the view frustum. In an embodiment, frustum culling 305 compares the coordinates of each vertex of a primitive with its w coordinate. For example, if any of the expressions x<−w, y<−w, x>+w, or y>+w is true for all the vertices of a primitive, then the primitive is outside of the view frustum and can be discarded.

Following the frustum culling 305, a screen-space transformation 310 transforms the vertices of a surviving (i.e. non-discarded) primitive to a viewport coordinate system. Typically, the screen-space transformation 310 scales the vertex coordinates by a screen scaling factor, divides the x and y coordinates of the vertex by their w coordinate, and adds a viewport bias to the coordinates. Additionally, the screen-space transformation 310 may convert vertices to a discrete, fixed-point coordinate system used for subsequent primitive setup and rasterization.

Scissor culling 315 is then performed on the transformed vertices. Scissor culling 315 discards primitives located entirely outside an application defined scissor region. Typically, scissor culling 315 is performed in a similar manner as frustum culling 305, with the extents of the scissor region taking the place of the +/−w coordinate in evaluating the vertex x and y coordinates.

Backface and zero area culling 320 discards primitives that are facing away from the viewer or that have zero area. Zero area primitives can be created when vertices are converted to a discrete fixed-point coordinate system. If a primitive is very small, then all of its vertices may be converted to the same point. Backface and zero area culling 320 computes the signed area of the primitive by calculating a vector product of the edges of the primitive. If the value of the signed area is less than or equal to zero, then the primitive is discarded. In an embodiment, the portion of the graphics processing subsystem for calculating this vector product has a limited numeric range to reduce its complexity. If the primitive is large, then the vector product calculation may overflow. In this case, the primitive is not discarded, and the setup unit will perform its own backface culling operation using a vector product calculation unit having a larger numeric range.

In an embodiment, the graphics processing subsystem uses one or more sub-pixel image samples to determine the output color of each pixel in the rendered image. Diamond culling 325, bounding box culling 330, and coarse grid line snap culling 335 culls small primitives that are within the view frustum and scissor region but do not cover or hit any pixel samples.

Figure 4A:
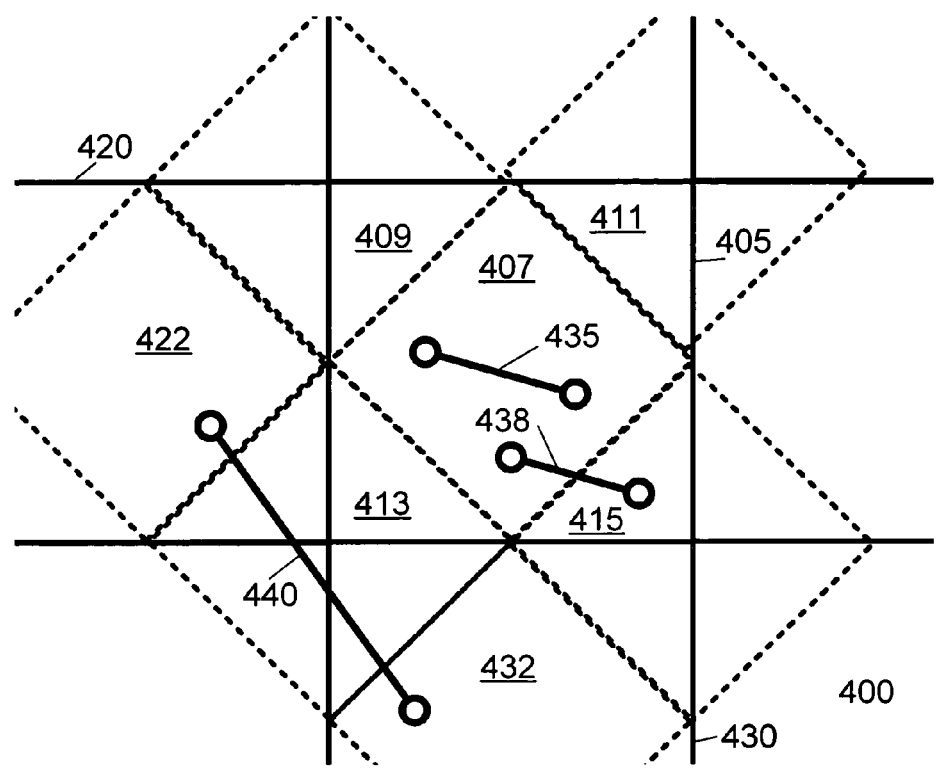
FIGS. 4A and 4B illustrate example applications of culling operations implemented by an embodiment of the invention.

FIG. 4A illustrates an example application of diamond culling. In this example, a set of pixels 400 are subdivided into a set of diamonds. For example, pixel 405 is divided into an internal diamond 407. Similarly, pixels 420 and 430 have internal diamonds 422 and 432, respectively. The internal diamond of each pixel coverts the center of the pixel. The portions of the pixel outside of its internal diamond is considered part of an external diamond. Pixel 405 includes portions of external diamonds 409, 411, 413, and 415.

In diamond culling 325, the vertices of each primitive are classified as internal or external points, depending on whether it is located in an external diamond or an internal diamond. A set of culling rules are used to determine whether the primitive should be discarded based upon the classification of its vertices. In an embodiment, a line is culled if both of its vertices are in the same diamond. For example, the vertices of line 435 are both within internal diamond 407, and thus under this culling rule, line 435 is discarded. In a further embodiment, a line is culled if one vertex is in an external diamond and another vertex is in a neighboring internal diamond. For example, line 438 has a vertex in internal diamond 407 and another vertex in adjacent external diamond 415, and thus under this culling rule, line 438 is discarded. In contrast, line 440 is not culled as it does not satisfy any of these culling rules.

Figure 4B:
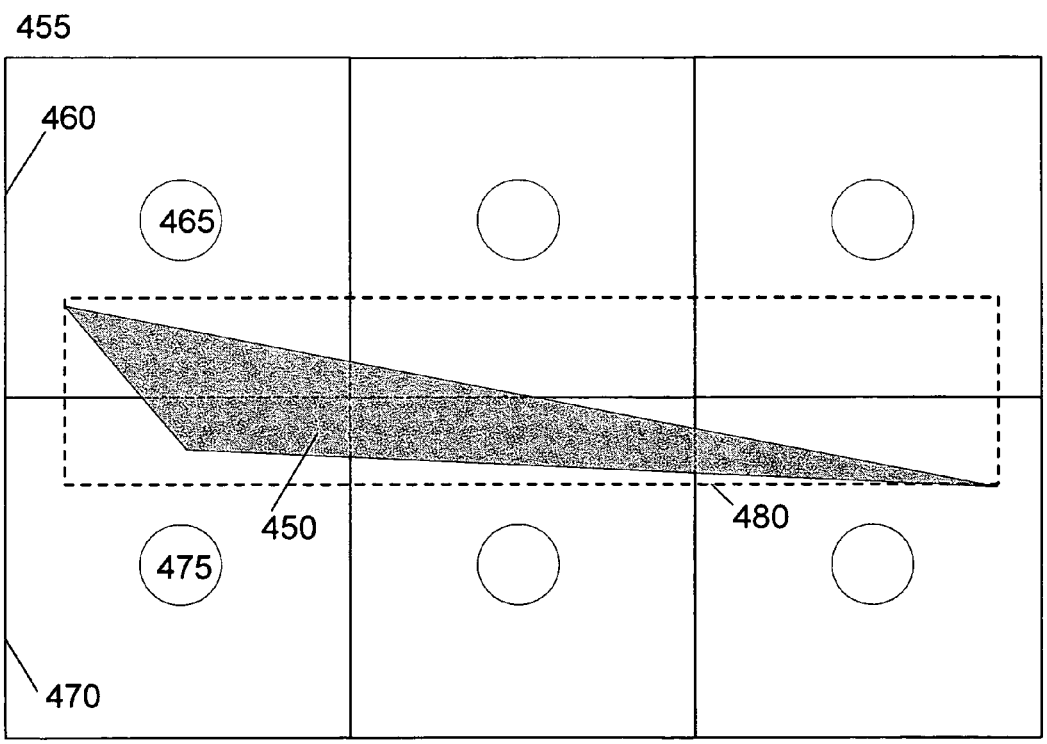

Like diamond culling, bounding box culling 330 discards primitives that fall between sub-pixel image samples. FIG. 4B illustrates an example application of bounding box culling 330. A primitive 450 covers portions of a set of pixels 455. Each pixel includes one or more sample points. For example, pixel 460 includes sample point 465, and pixel 470 includes sample point 475. Bounding box culling 330 associates a bounding box 480 with the primitive 450. The bounding box 480 covers the primitive 450. Bounding box culling 330 determines if the bounding box 480 contacts any sample points. If the bounding box 480 does not contact any sample point, then it follows that the associated primitive 450 does not contact any sample points either, and thus the primitive 450 can be discarded.

Coarse grid line snap culling 335 discards lines that have zero length. Like zero area primitives discussed above, zero length lines can be created when vertices are converted to a discrete fixed-point coordinate system. If a line is very small, then all of its vertices may be converted to the same point. In an embodiment, lines are converted to a lower-precision fixed point coordinate system than the coordinate system used for other geometric primitives. As a result, the threshold size for lines to be culled by coarse grid line snap culling 435 is increased, typically resulting in a greater number of lines being culled.

Figure 5:
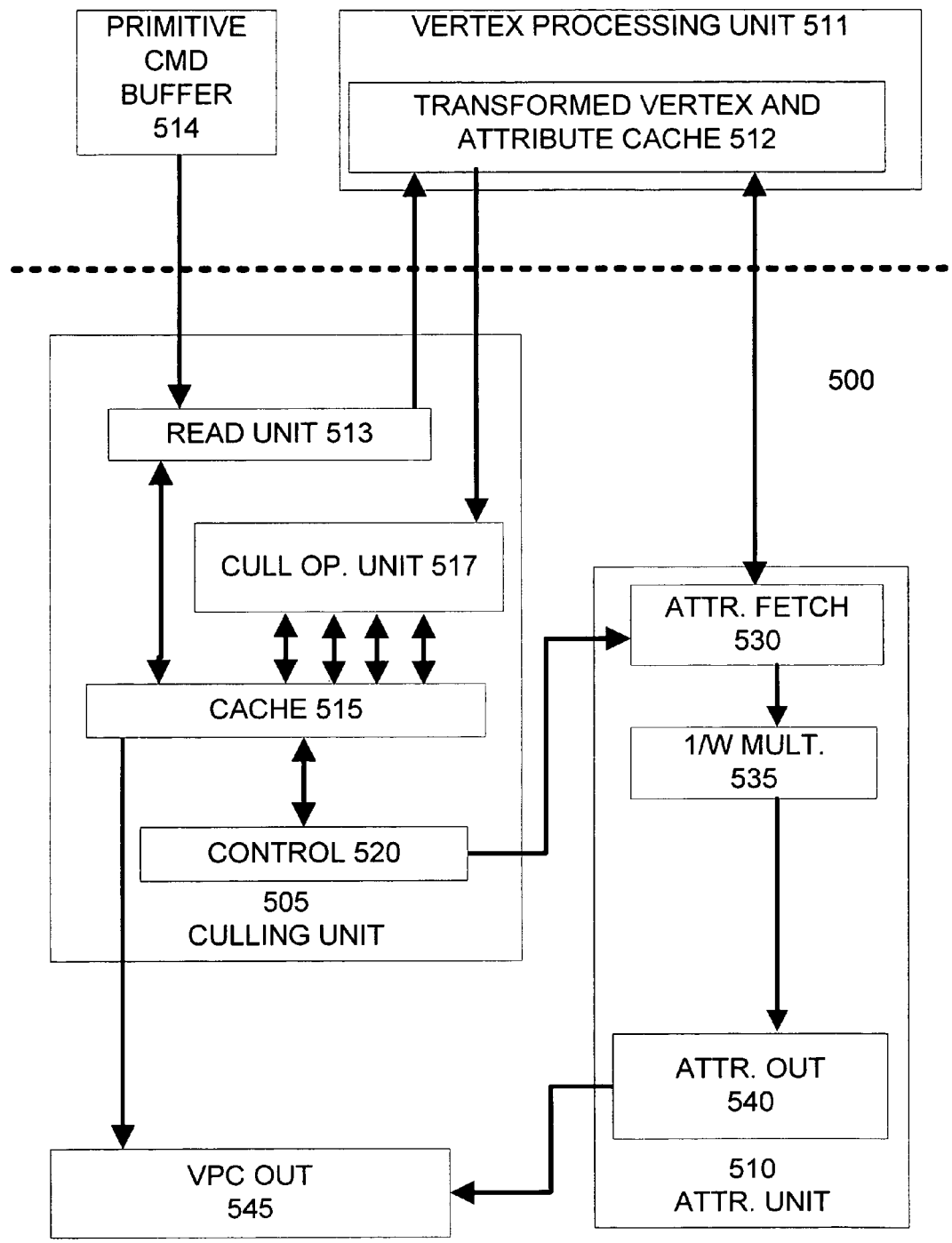
FIG. 5 illustrates a viewport and culling unit according to an embodiment of the invention.

FIG. 5 illustrates a viewport and culling (VPC) unit 500 according to an embodiment of the invention. The VPC unit 500 is interfaced with a vertex processing unit 511, similar to the vertex processing unit 205 discussed above. In this embodiment, the vertex processing unit 511 includes a cache 512 for storing vertex positions and their associated attributes after transformation and other processing by the vertex processing unit 511. The VPC 500 is also interfaced with a primitive command buffer 519, which stores commands defining primitives to be rendered. In an embodiment, each command in the primitive command buffer 514 specifies a primitive and includes indices or pointers to one or more vertices stored in the cache 512 that define the primitive. For example, a primitive command defining a point will include one vertex index, a primitive command defining a line will include two vertex indices, and a primitive command defining a line will include three vertex indices. In an embodiment, the primitive command buffer 514 is a FIFO buffer that preserves the order of primitives sent to the graphics processing subsystem during rendering.

The VPC unit 500 includes a culling unit 505 and an attribute fetch unit 510. Within the VPC unit 500, the processing of a primitive is begun when the read unit 513 retrieves a primitive command from the primitive command buffer 514. For each vertex referenced by the primitive command, the read unit 513 will first check VPC cache 515 to determine if a copy of the referenced vertex has already been retrieved from the cache 512 and stored in the VPC cache 515. As discussed below, in an embodiment, the VPC cache 515 also stores the results of some culling operations, so that a portion of the culling operations do not have to be repeated for primitives that reuse a vertex in the VPC cache 515.

If the VPC cache 515 does not include a vertex referenced by the primitive command, then read unit 513 dispatches a request for the vertex from the cache 512. In response to a request from the read unit 513, the cache 512 returns the vertex data to the culling unit 505. In an embodiment, the cache 512 minimizes memory bandwidth by only returning vertex data needed for culling operations, such as the vertex position, to the culling unit 505. As discussed in detail below, vertex data not used for culling operations, including vertex attributes such as color, texture coordinates, vertex normal vectors, and other scalar and vector attributes, are not retrieved from the cache 512 until after the culling unit 505 completes the series of culling operations and determines that the associated primitive is potentially visible in the rendered image.

In a further embodiment, a copy of the vertex data received from cache 512 is stored in VPC cache 515, using a least-recently-used replacement scheme to overwrite vertex data previously stored in the cache. The size, or number of cache lines, of the VPC cache 515 can be tailored to fit the order of primitives sent to the graphics processing subsystem. For example, if the primitives are typically generated from a highly structured geometry format, such as triangle strips or fans, then the VPC cache 515 may be relatively small and still result in a significant percentage of cache hits. For less structured geometry formats, such as general unstructured meshes, a larger VPC cache 515 can be used to increase the likelihood of cache hits when retrieving vertex data. In one implementation, the VPC cache 515 includes four cache lines for storing vertex data for four vertices. In an alternate implementation, the VPC cache 515 includes eight cache lines for storing vertex data for eight vertices.

The culling operations unit 517 receives the vertex data from the cache 512 or from VPC cache 515 and begins to perform a series of culling operations on the primitive. In an embodiment, the series of culling operations is similar to series 300 discussed above. In alternate embodiments, the culling operations unit 517 performs a subset or a superset of the series 300 of culling operations. As discussed in detail below, an embodiment of the culling operations unit uses a pipelined execution scheme to perform some or all of the culling operations in parallel. Additionally, an embodiment of the culling unit 505 uses a pipelined execution scheme so that multiple primitives can be simultaneously processed by the various subunits of the culling unit 505.

The culling operations unit 517 outputs the vertex data transformed to screen-space coordinate system, which in an embodiment is stored in the VPC cache 515. Additionally, the culling operations unit 517 outputs one or more culling outcodes for each of the culling operations it performs. Each culling outcode specifies the result of corresponding culling operation. For some culling operations, such as frustum, scissor, and diamond culling, portions of the culling operation are performed on a per-vertex, rather than per-primitive basis. Consequently, these portions of the culling operations will remain unchanged and can be reused for culling of additional primitives that use the same vertices. In a further embodiment, the culling outcodes of at least some of the culling operations specify per-vertex culling information. These culling outcodes are stored in the VPC cache 515 in association with the corresponding vertex data. When subsequent primitives associated with one or more cached vertices are processed, associated culling outcodes will be retrieved from the cache and the corresponding culling operations will be bypassed for the cached vertices.

Control unit 520 evaluates the culling outcodes associated with the primitive to determine if the primitive should be culled. In an embodiment, a culling outcode indicates the result of the culling operation on the entire primitive. For example, for backface culling, the culling outcode indicates whether the signed area of the primitive is either less than or equal to zero, or is greater than zero. In the case of the former condition, the control unit 520 will cull the primitive. In a further embodiment, the control unit 520 compares culling outcodes of each of the vertices of a primitive to determine whether the primitive is to be culled. For example, the frustum culling operation can output for each vertex of a primitive a set of culling outcodes specifying the position of the vertex relative to each of the planes of the view frustum. The control unit 520 will cull a primitive if all of the vertices of the primitive have the same value for at least one of their respective sets of culling outcodes.

If the control unit 520 determines that the primitive is not visible in the final rendered image, then the corresponding primitive command is not sent to the attribute unit 510, thus culling the primitive. Alternatively, if the control unit 520 determines that the primitive is potentially visible in the final rendered image (at least at this point in the graphics processing subsystem) then the corresponding primitive command is sent from the culling unit to the attribute unit 510. It should be noted that even if the VPC unit 500 determines that a primitive is potentially visible, subsequent portions of the graphics processing subsystem may perform additional culling operations and determine that the primitive is in fact not visible in the final rendered image and should be culled. As discussed above, an embodiment of the VPC unit 500 minimizes the memory bandwidth usage to the vertex and attribute cache 512 by first retrieving vertex data used for culling operations, and then, if the primitive is not culled, by retrieving the additional attributes of the vertices of the primitive.

Upon receiving a primitive command from the culling unit 505, the attribute fetch unit 530 of the attribute unit 510 begins to retrieve the attributes of the vertices referenced by the primitive command. The attribute fetch unit 530 retrieves vertex attributes from the transformed vertex and attribute cache 512. In an embodiment, the attribute fetch unit 530 locates the attributes of each vertex in the cache 512 using the reference to the vertex in the primitive command. In an embodiment, each vertex can be associated with an arbitrary number of scalar or vector attributes. Applications can define the values of these attributes, which can then be used by vertex and fragment shader programs for rendering. Depending upon the number of attributes associated with a vertex and the width of the data bus between the cache 512 and the attribute unit 510, the attribute fetch unit 530 may require multiple memory accesses to retrieve all of the attributes from the cache 515. In an embodiment, the attribute fetch unit 530 retrieves multiple attributes of a vertex simultaneously from the cache 512 using a single memory access.

As attributes are retrieved by the attribute fetch unit 530, they are dispatched to the 1/w multiplier unit 535. The 1/w multiplier unit 535 multiplies each attribute by the inverse of the w coordinate of its associated vertex to allow for perspective correct interpolation during rendering. Alternatively, 1/w multiplier unit 535 can be bypassed for some or all of the attributes if perspective correction is not required. Regardless of whether perspective correction is applied or not, the 1/w multiplier unit 535 outputs attributes to the attribute out unit 540.

Attribute out unit 540 collects attributes output from the 1/w multiplier 535 and temporarily stores these attributes until all of the attributes associated with a vertex have been retrieved from the cache 512 and processed by the 1/w multiplier 535. Once the processing of attributes is completed for a vertex, the attribute out unit 540 outputs the complete set of processed vertex attributes to the VPC out unit 545. The VPC out unit 545 recombines the set of vertex attributes with the vertex data retrieved and processed by the culling unit 505, such as vertex positions expressed in viewport coordinate space. In an embodiment, the VPC out unit 545 retrieves vertex data from VPC cache 515 and reassociates this vertex data with the set of attributes processed by the attribute unit 510. The combined vertex data and attributes are then output from the VPC out unit 545 for further processing by the graphics processing subsystem, for example by the setup unit and color assembly unit. Additionally, the primitive commands associated with the combined vertex data and attributes are output from the VPC out unit 545.

Figure 6A:
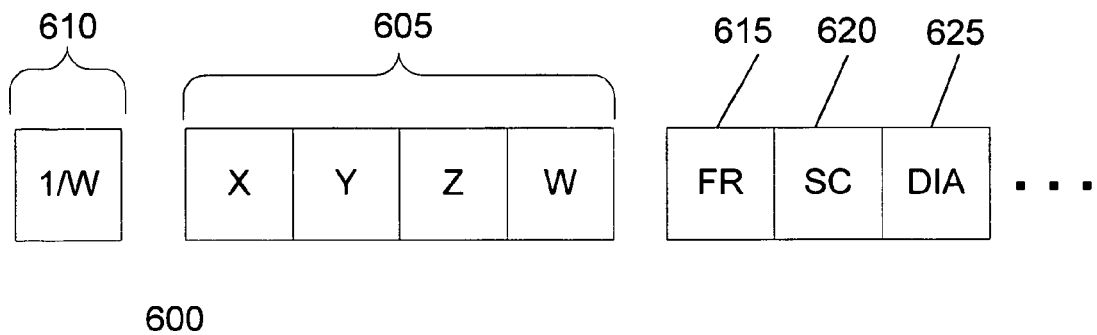
FIGS. 6A-6C illustrate the format of a vertex cache line according to an embodiment of the invention.
Figure 6B:
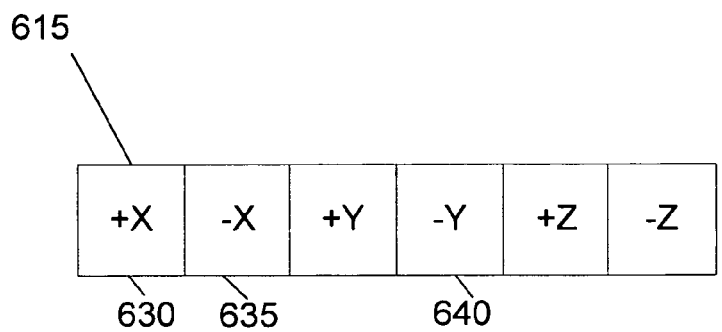
Figure 6C:
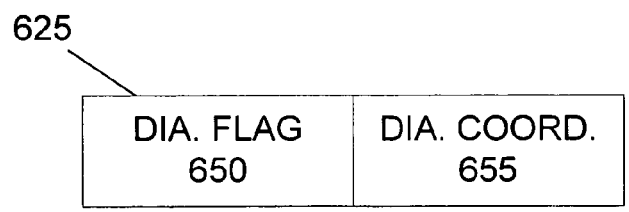

FIGS. 6A-6C illustrate the format of a vertex cache line of the VPC cache 515 according to an embodiment of the invention. FIG. 6A illustrates a portion of a cache line 600 of the VPC cache 515 according to an embodiment. Cache line 600 includes the vertex coordinates 605. In an embodiment, the vertex coordinates 605 are expressed in a viewport coordinate system (x,y,z,w) as described above. Cache line 610 also stores 1/w 610, which is the inverse value of the w coordinate. In an embodiment, the 1/w value is computed by the culling operations unit 517. The 1/w 610 value is passed along to attribute unit 510 when retrieving attributes associated with the vertex, so that perspective correction can be applied to attributes as described above.

Cache line 600 also includes a set of one or more culling outcodes 612. In this embodiment, the set of culling outcodes 612 includes frustum culling outcodes 615, scissor culling outcodes 620, and diamond culling outcodes 615. The set of culling outcodes 612 may include additional culling outcodes, depending upon the culling operations performed by the culling unit 505.

FIG. 6B illustrates the set of frustum culling outcodes 615 in greater detail according to an embodiment of the invention. As discussed above, frustum culling evaluates the position of each vertex in a primitive relative to the boundaries of the view frustum. In this embodiment, each of the set of frustum culling outcodes 615 indicates the position of the vertex relative to one of the planes of view frustum. For example, the position of a vertex (x,y,z,w) relative to the −x plane of the view frustum is determined by the expression x<−w. Similarly, the position of a vertex relative to the +x, −y, and +y planes of the view frustum is determined by evaluating the expressions x>w, y<−w, and y>w, respectively.

In an embodiment, the result of the evaluation of each of these expressions is stored in a corresponding one of the set of frustum culling outcodes. For example, culling outcodes 630, 635, and 640 are associated with the expressions x>w, x<−w, and y<−w, respectively. For a given vertex, the result of each evaluation is an indicator of whether the expression is true or false. In an embodiment, a frustum culling outcode is determined for the +x, −x, +y, and −y planes of the view frustum. In an additional embodiment, frustum culling outcodes are determined for the near and far planes of the view frustum. In another embodiment, frustum culling outcodes specify if vertices have a w coordinate less than zero, so that primitives with all its vertices having w coordinates less than zero can be culled.

A primitive will be culled by frustum culling if one or more of the frustum culling expressions are true for all of the vertices of a primitive. In an embodiment, the control unit 520 compares the values of each of the set of culling outcodes for the vertices of a primitive. If a culling outcode has a true value for each of the vertices of the primitive, then the primitive is culled. In a further embodiment, scissor culling can be implemented using a second set of culling outcodes similar to set 615, with each culling outcode indicating the position of a vertex of a primitive with respect to a boundary of a scissor region.

FIG. 6C illustrates the set of diamond culling outcodes 625 in greater detail according to an embodiment of the invention. As discussed above, diamond culling removes primitives that are within the view frustum and scissor region but do not cover or hit any pixel samples. The set of diamond culling outcodes 625 includes a diamond flag outcode 650 and a diamond coordinate outcode 655. The diamond flag outcode 650 specifies whether a vertex in located in an internal diamond or one of the four external diamonds associated with a pixel. The diamond coordinate outcode 655 specifies the coordinates of diamond covering the vertex. In an embodiment, the control unit 520 compares the diamond flag outcode 650 and diamond coordinate outcode 655 of each vertex in a primitive and uses the diamond culling rules discussed above to determine if the primitive should be culled.

Figure 7:
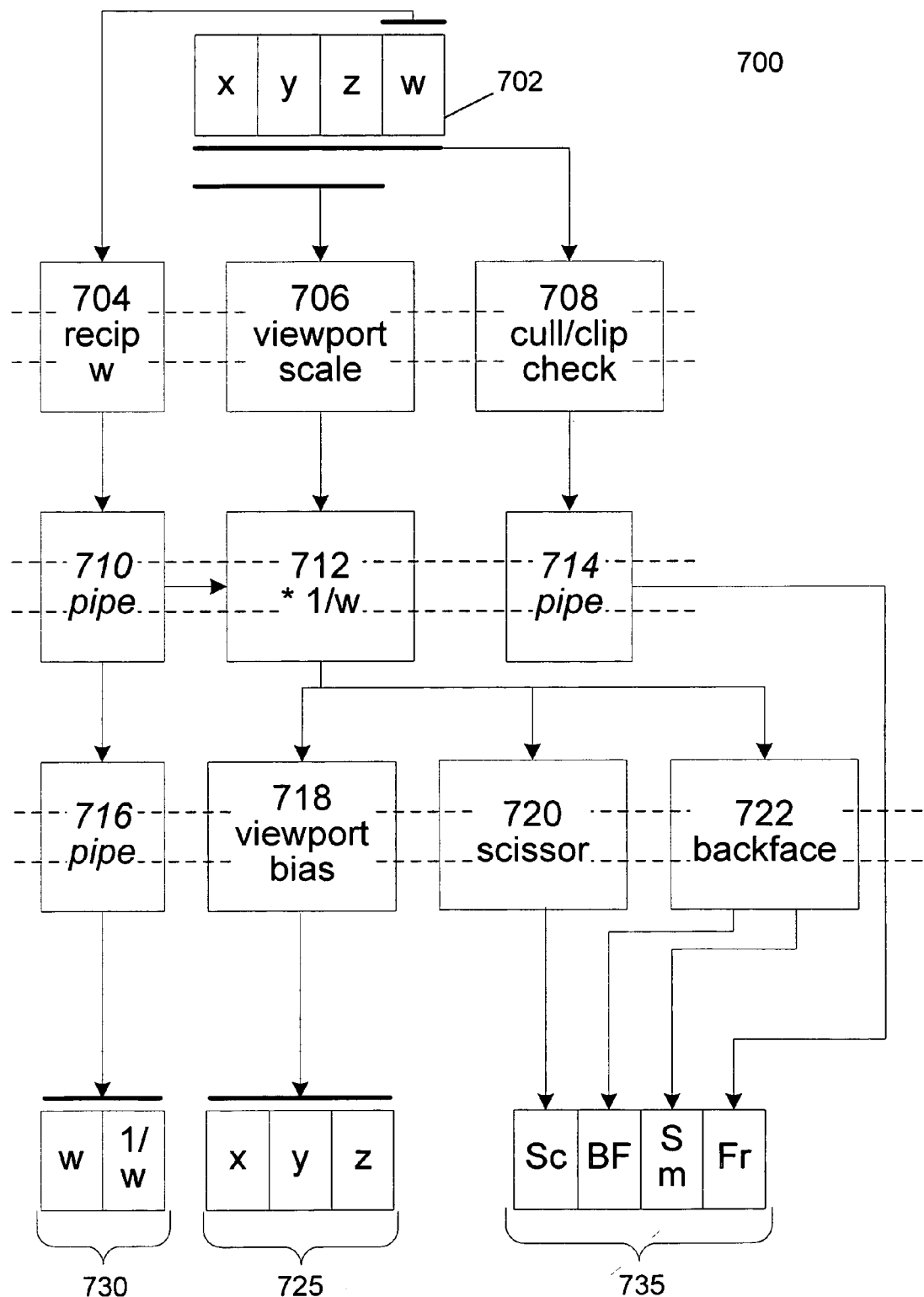
FIG. 7 illustrates a pipelined implementation of culling operations according to an embodiment of the invention.

FIG. 7 illustrates a pipelined implementation of culling operations according to an embodiment of the invention. The pipeline 700 corresponds to a portion of an embodiment of the culling operations unit 517. The pipeline 700 begins with a set of vertex coordinates (x,y,z,w) for a vertex associated with a primitive. In an embodiment, units 704, 706, and 708 process vertex data in parallel. The w coordinate of the vertex is output to the reciprocal w unit 704, which computes the value 1/w. The x, y, and z coordinates are read by the viewport scale unit 706, which multiplies each of the coordinates by a screen scaling factor.

Additionally, the culling clip check unit 708 compares each of x, y, and z coordinate with positive and negative versions of the w coordinate to determine the location of the vertex relative to the boundaries of the view frustum, as described above. In an embodiment, the result of this comparison is output from the culling clip check unit 708 in the form of a set of frustum culling outcodes, which pass through pipeline delay unit 714 and are stored in portion 735 of a VPC cache line.

In an embodiment, units 710, 712, and 714 process vertex data in parallel. The output of the reciprocal w unit 704 is sent to pipeline delay unit 710. In an embodiment, the reciprocal w unit 704 outputs both the original w coordinate value and its reciprocal. Pipeline delay unit 710 acts as a delay buffer to maintain synchronization of the vertex data being processed in parallel. Additionally, pipeline delay unit 710 outputs the reciprocal of the w coordinate to the 1/w multiplier unit 712 and to a second pipeline delay unit 716. After a synchronization delay, the second pipeline delay unit 716 stores the w coordinate and its reciprocal in portion 730 of a VPC cache line.

The 1/w multiplier unit 712 receives the scaled vertex coordinates from the viewport scale unit 706 and multiplies them by the 1/w value received from the pipeline delay unit 710. The 1/w multiplier unit 712 outputs the processed set of vertex coordinates to viewport bias unit 718, scissor unit 720, and to backface culling unit 722. In an embodiment, units 716, 718, 720, and 722 process vertex data in parallel. The viewport bias unit 718 adds a bias value to the vertex coordinates, thus completing the transformation of the vertex coordinate from a clip-space coordinate system to a screen-space coordinate system. The viewport bias unit 718 stores the transformed vertex coordinates in portion 725 of a VPC cache line.

The scissor unit 720 receives a copy of the processed vertex coordinates from the 1/w multiplier unit 712 and performs a scissor culling operation on the vertex to determine the position of the vertex relative to the boundaries of the scissor region. In an embodiment, the result of this comparison is output from the scissor unit 720 in the form of a set of scissor culling outcodes, which are then stored in portion 735 of a VPC cache line.

The backface culling unit performs a backface culling operation on the primitive defined by the vertex received from unit 712 and additional vertices stored in the VPC cache. The result of the backface culling operation, for example the sign of a signed area computation of the primitive, is represented by a backface culling outcode and is output from unit 722 and stored in portion 735 of a VPC cache line. Although not shown in FIG. 7, additional culling operations, such as diamond culling, bounding box culling, and coarse-grid line snap culling, can be similarly integrated into the pipeline 700.

This invention enables the culling operations to be performed as soon as possible in the graphics processing subsystem to decrease wasteful rendering operations. Additionally, the invention reduces the bandwidth requirements for communicating vertices and associated attributes within the graphics processing subsystem by opportunistically culling primitives before retrieving all of the attributes associated with vertices. Additionally, the culling unit in the VPC unit reduces processing bottlenecks in the setup unit without substantially increasing the complexity of the VPC unit. Although the invention has been described with reference to an example VPC unit and a specific series of culling operations, the invention may be applied to any processing unit in a graphics processing subsystem performing any type of culling operation. The invention has been discussed with respect to specific examples and embodiments thereof; however, these are merely illustrative, and not restrictive, of the invention. Thus, the scope of the invention is to be determined solely by the claims.

What is claimed is:

1. A graphics processing subsystem adapted to render a stream of primitives, the graphics processing subsystem comprising:
   a first cache memory adapted to store a set of vertices associated with at least a portion of a first stream of primitives;
   a viewport and culling unit adapted to receive the first stream of primitives and to transform a subset of the set of vertices associated with each primitive to a screen-space coordinate system;
   a setup unit adapted to receive a second stream of primitives from the viewport and culling unit and to prepare each primitive for rasterization; and
   wherein the viewport and culling unit is adapted to determine the potential visibility of each one of the first stream of primitives and to output as the second stream of primitives a subset of the first stream of primitives that are potentially visible; and
   wherein the setup unit is further adapted to determine the potential visibility of each one of the second stream of primitives and to output a third stream of primitives that are potentially visible.

2. The graphics processing subsystem of claim 1, wherein the viewport and culling unit is adapted to determine the potential visibility of primitives using at least a first culling operation, and the setup unit is adapted to determine the potential visibility of primitives using at least a second culling operation.

3. The graphics processing subsystem of claim 1, wherein the viewport and culling unit is adapted to determine the potential visibility of primitives within a range limit using at least a first culling operation, and the setup unit is adapted to determine the potential visibility of primitives outside of the range limit using at least the first culling operation.

4. The graphics processing subsystem of claim 1, wherein the viewport and culling unit is adapted to determine the potential visibility of each one of the first stream of primitives using a frustum culling operation.

5. The graphics processing subsystem of claim 1, wherein the viewport and culling unit is adapted to determine the potential visibility of each one of the first stream of primitives using a backface culling operation.

6. The graphics processing subsystem of claim 1, wherein the viewport and culling unit is adapted to determine the potential visibility of each one of the first stream of primitives using a bounding box culling operation.

7. The graphics processing subsystem of claim 1, wherein the viewport and culling unit is adapted to determine the potential visibility of each one of the first stream of primitives using a diamond culling operation.

8. The graphics processing subsystem of claim 1, wherein the viewport and culling unit is adapted to determine the potential visibility of each one of the first stream of primitives using a scissor culling operation.

9. The graphics processing subsystem of claim 1, wherein the viewport and culling unit is adapted to determine the potential visibility of each one of the first stream of primitives using a coarse grid line snap culling operation.

10. The graphics processing subsystem of claim 1, wherein the first stream of primitives includes a point.

11. The graphics processing subsystem of claim 1, wherein the first stream of primitives includes a line.

12. The graphics processing subsystem of claim 1, wherein the first stream of primitives includes a triangle.

13. The graphics processing subsystem of claim 1, wherein the first cache memory is adapted to store the set of vertices after a transformation by a vertex processing unit.

14. The graphics processing subsystem of claim 1, wherein the viewport and culling unit is adapted to retrieve a subset of the set of vertices associated with a primitive from the first cache memory in response to each one of the first stream of primitives.

15. The graphics processing subsystem of claim 1, wherein the viewport and culling unit includes a second cache memory adapted to store a copy of a first subset of the set of vertices of the first cache memory, and wherein for each one of the first stream of primitives, the viewport and culling unit is adapted to retrieve a second subset of the set of vertices from the first cache memory in response to a determination that the copy of the first subset of vertices does not include the subset of the set of vertices associated with the primitive.

16. The graphics processing subsystem of claim 15, wherein the second cache memory is further adapted to store an indicator of the result of at least one culling operation in association with the copy of the first subset of vertices.

17. The graphics processing subsystem of claim 15, wherein the copy of the first subset of vertices is transformed into a screen-space coordinate system.

18. The graphics processing subsystem of claim 1, wherein the viewport and culling unit is adapted to determine the potential visibility of primitives using a set culling operations performed in parallel.

19. The graphics processing subsystem of claim 1, further including a graphics memory device adapted to store graphics data including a rendered image including at least a portion of at least one of the first stream of primitives.

* * * * *